(12) United States Patent
Haldeman et al.

(10) Patent No.: US 9,706,140 B2
(45) Date of Patent: Jul. 11, 2017

(54) NATURAL RESOLUTION PROCESSING FOR LWIR IMAGES

(71) Applicant: United Technologies Corporation, Hartford, CT (US)

(72) Inventors: Charles W. Haldeman, Simsbury, CT (US); Andrew Consiglio, Southbury, CT (US); Christopher J. Lehane, South Windsor, CT (US); Mark F. Zelesky, Bolton, CT (US)

(73) Assignee: United Technologies Corporation, Farmington, CT (US)

( * ) Notice: Subject to any disclaimer, the term of this patent is extended or adjusted under 35 U.S.C. 154(b) by 249 days.

(21) Appl. No.: 14/560,843

(22) Filed: Dec. 4, 2014

(65) Prior Publication Data

US 2015/0172566 A1  Jun. 18, 2015

Related U.S. Application Data

(60) Provisional application No. 61/917,719, filed on Dec. 18, 2013.

(51) Int. Cl.
*H04N 5/33* (2006.01)
*H04N 5/265* (2006.01)
*G06T 5/50* (2006.01)

(52) U.S. Cl.
CPC ............. *H04N 5/33* (2013.01); *G06T 5/50* (2013.01); *H04N 5/265* (2013.01); *G06T 2207/10016* (2013.01); *G06T 2207/10048* (2013.01); *G06T 2207/20216* (2013.01); *G06T 2207/30164* (2013.01)

(58) Field of Classification Search
CPC ............... H04N 5/33; H04N 5/265; G06T 2207/10048; G06T 2207/30164; G06T 5/50; G06T 2207/20216; G06T 7/0004
See application file for complete search history.

(56) References Cited

U.S. PATENT DOCUMENTS 5,519,529 A    5/1996  Ahearn et al.
5,734,369 A *  3/1998  Priem .................. G09G 5/02
                                              345/597

(Continued)

FOREIGN PATENT DOCUMENTS

EP       1075135 A2     2/2001
WO    WO2009016624 A2   2/2009

*Primary Examiner* — Obafemi Sosanya
(74) *Attorney, Agent, or Firm* — Kinney & Lange, P.A.

(57) ABSTRACT

A method for thermally imaging a moving workpiece of a gas turbine engine using long wavelength infrared (LWIR) images of the workpiece captured during operation of the gas turbine engine. The method comprises determining average pixel intensity and pixel variation in intensity for each pixel across the plurality of LWIR images, determining average area intensity and area variation in intensity across a range of areas defined by increasing length scales about a selected pixel, and identifying as a critical length scale a length scale at which area variation in intensity is minimized as a function of length scale, for which the area intensity remains substantially the same as the average pixel intensity of the selected pixel. A composite image is built such that each pixel of the composite image has intensity equal to an average area intensity centered on that pixel, over the critical length scale.

14 Claims, 5 Drawing Sheets

(56) References Cited

U.S. PATENT DOCUMENTS

| | | | |
|---|---|---|---|
| 6,157,749 A | 12/2000 | Miyake | |
| 7,345,277 B2 | 3/2008 | Zhang | |
| 7,702,015 B2 | 4/2010 | Richter et al. | |
| 8,351,069 B2 | 1/2013 | Fujishita | |
| 8,410,441 B2 | 4/2013 | Stratmann et al. | |
| 8,413,493 B1* | 4/2013 | Polywoda, III | G01M 15/14 73/112.01 |
| 8,515,209 B2 | 8/2013 | Shiraishi | |
| 2004/0120383 A1 | 6/2004 | Kennedy et al. | |
| 2006/0087649 A1* | 4/2006 | Ogawa | G01N 21/9501 356/237.5 |
| 2006/0245645 A1* | 11/2006 | Yatziv | G06T 5/005 382/167 |
| 2013/0050466 A1 | 2/2013 | Cetin et al. | |
| 2013/0176418 A1* | 7/2013 | Pandey | G01N 25/72 348/83 |
| 2013/0222604 A1 | 8/2013 | Ingerhed et al. | |
| 2013/0251287 A1 | 9/2013 | Kawamura et al. | |

* cited by examiner

NATURAL RESOLUTION PROCESSING FOR LWIR IMAGES

BACKGROUND

The present invention relates generally to image processing, and more particularly to image processing for thermal imaging of a gas turbine engine, in use.

Gas turbine engines are used in a wide variety of applications, from aircraft engines to industrial power generators. Engine parts may degrade with time, and parts subjected to high thermal stresses are particularly vulnerable. Diagnostic systems can identify and pinpoint degrading parts before failures can occur enabling efficient maintenance procedures, decreasing unexpected engine downtimes, increasing engine life, and avoiding catastrophic failures.

Thermal imaging is particularly useful for gas turbine diagnostics. Unexpected heating can correspond to part degradation, cooling channel blockage, or other maintenance indicators. By comparing thermal images of a turbine engine workpiece against thermal images of expected heat profiles, thermal imaging systems can assist in engine diagnostics. Diagnostic precision is limited by the precision of cameras, and can be further limited by background heat, by the speed of workpieces (e.g. engine rotors) relative to camera shutter rates, and by vibration within the gas turbine engine.

SUMMARY

A method for thermally imaging a moving workpiece of a gas turbine engine using long wavelength infrared (LWIR) images of the workpiece captured during operation of the gas turbine engine. The method comprises determining average pixel intensity and pixel variation in intensity for each pixel across the plurality of LWIR images, determining average area intensity and area variation in intensity across a range of areas defined by increasing length scales about a selected pixel, and identifying as a critical length scale a length scale at which area variation in intensity is minimized as a function of length scale. A composite image is built such that each pixel of the composite image has intensity equal to an average area intensity centered on that pixel, over the critical length scale.

DETAILED DESCRIPTION

Figure 1:
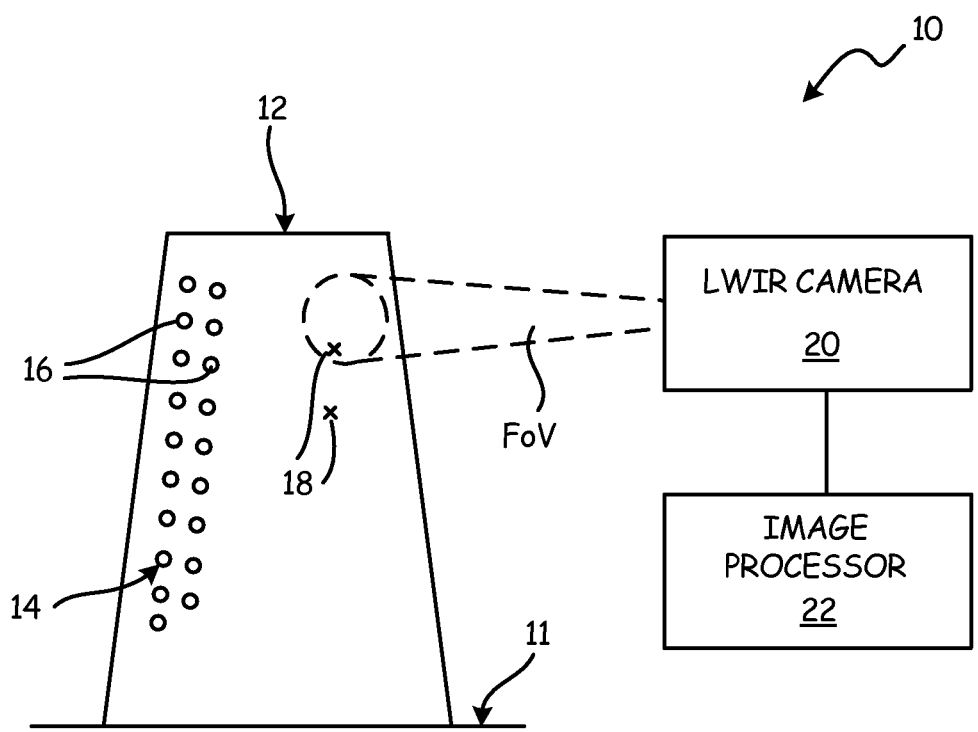
FIG. 1 is schematic view of one embodiment of a thermal imaging system according to the present invention.

FIG. 1 is a schematic view of thermal imaging system 10 and workpiece 12 of gas turbine engine 11 (only a portion of engine 11 is shown). Gas turbine engine 11 can, for instance, be an aircraft main turbine, an aircraft auxiliary power unit, or an industrial power turbine. Workpiece 12 is a component of gas turbine engine 11 such as a turbine or compressor section rotor blade. Workpiece 12 has a plurality of well-defined geometric features 14. Geometric features 14 can include both integral features 16, such as cooling holes or surface irregularities of workpiece 12, and artificial features 18, such as markings or targets applied to workpiece 12 specifically for diagnostic purposes.

Imaging system 10 includes sensor 20 and image processor 22. Sensor 20 is a long wavelength infrared (LWIR) camera disposed to capture images of workpiece 12 while workpiece 12 is in motion. In particular, LWIR camera 20 can be disposed permanently (e.g. for continual failure monitoring) or temporarily (e.g. for intensive maintenance or testing) within gas turbine engine 11, such that LWIR camera 20 capture a plurality of thermal images of workpiece 12 during operation of gas turbine engine 11. LWIR radiation can be used to improve overall accuracy by reducing sensitivity to emissivity within ordinary operating temperatures of gas turbine engine 11. LWIR camera 20 has a field of view (marked FoV) that processes across at least a part of workpiece 12 while workpiece 12 is in motion during operation of gas turbine engine 11.

Image processor 22 can, for instance, include a microprocessor or programmable computer with suitable memory and other hardware that combines images captured by LWIR camera 20 to form a composite thermal images of workpiece 12 according to the method set forth below with respect to FIGS. 3-6. Image processor 22 can be situated within gas turbine engine 11, or can receive captured images from LWIR camera 20 remotely.

Although only one LWIR camera 20 is shown in FIG. 1, alternative embodiments of the present invention can include multiple LWIR cameras. Image processor 22 can process images from multiple cameras to produce multiple composite images. In addition, image processor 22 can in some embodiments process images from multiple cameras with overlapping fields of view of workpiece 12 to produce shared composite images.

Figure 2:
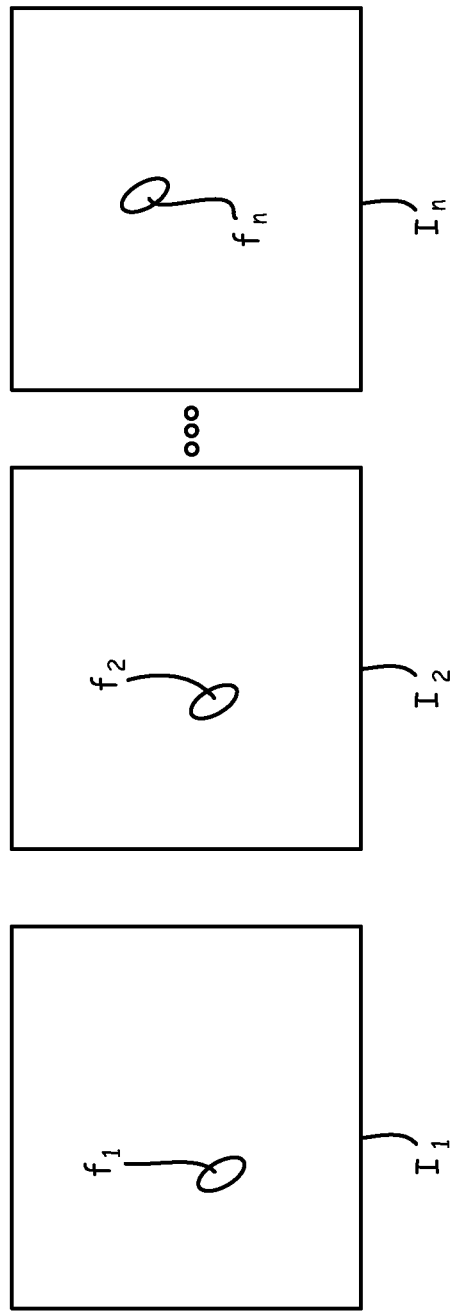
FIG. 2 schematic view of a plurality of images captured by the thermal imaging system of FIG. 1.

FIG. 2 is a schematic view of images $I_1, I_2, \ldots I_n$. Images $I_1, I_2, \ldots I_n$ are thermal images of workpiece 12 captured by LWIR camera 20 (see FIG. 1), or by multiple LWIR cameras with overlapping fields of view, during operation of gas turbine engine 11. Each image $I_1, I_2, \ldots I_n$ is shown with a single illustrative feature sub-image $f_1, f_2, \ldots f_n$, respectively, corresponding to a common geometric feature 14. Images $I_1, I_2, \ldots I_n$ can, for example, be consecutive images in time captured by LWIR camera 20 as workpiece 12 moves through the field of view of LWIR camera 20. Despite corresponding to the same geometric feature 14 of workpiece 12, feature sub-images $f_1, f_2, \ldots f_n$ are not necessarily located in identical positions on images $I_1, I_2, \ldots I_n$. This variation in feature sub-image location is due in part to predictable movement of workpiece 12 between capture of each image, e.g. the rotation of a rotor blade while gas turbine engine 11 is in operation. The variation in feature sub-image location can also be due to unpredictable vibration of workpiece 12 that diminishes the effective precision of thermal imaging system 10.

Figure 3:
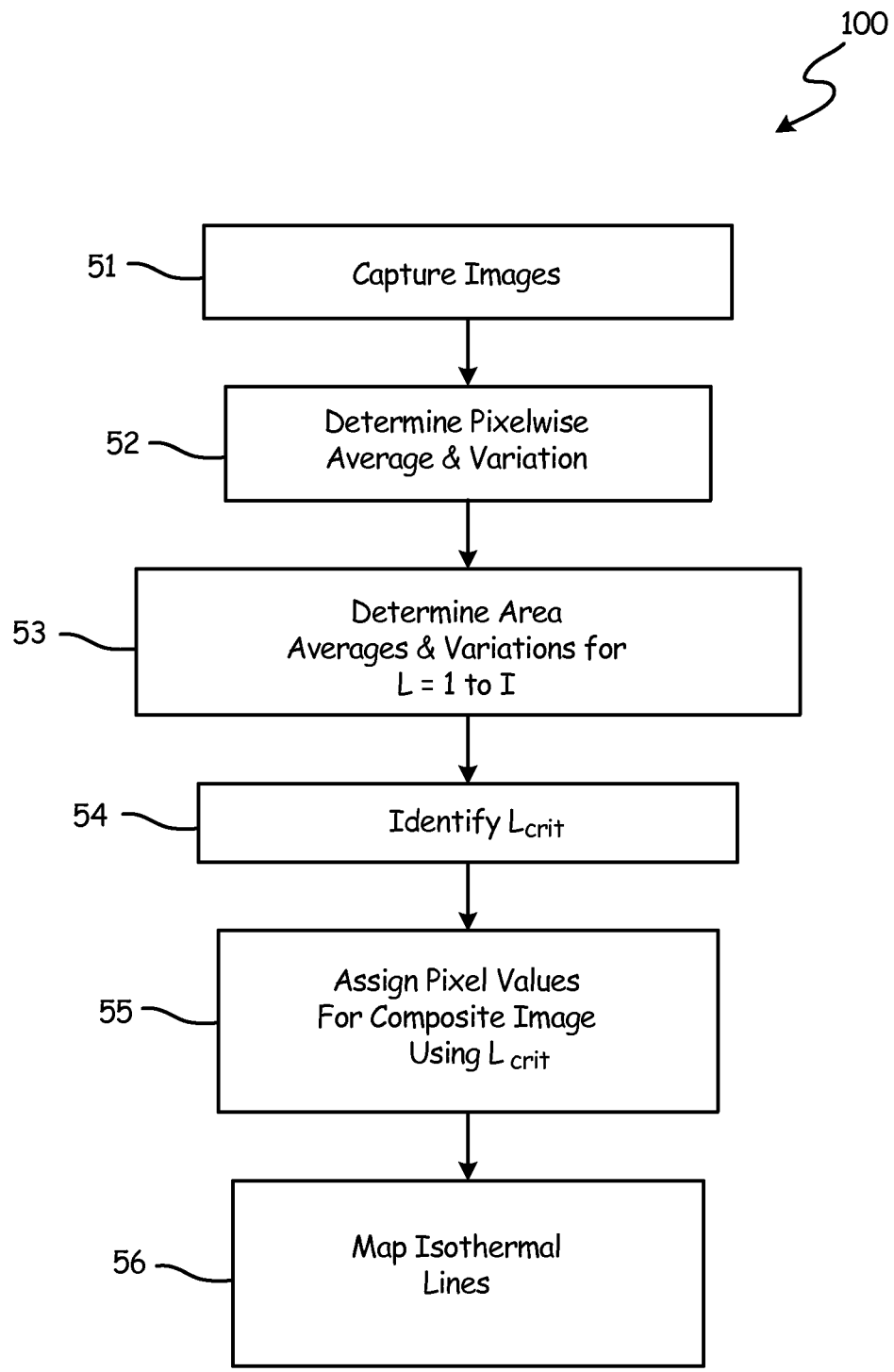
FIG. 3 is a method flowchart illustrating an image processing method by which a composite images is constructed from the captured images of FIG. 2.

FIG. 3 is a method flowchart illustrating a method by which thermal imaging system 10 produces a composite image $I_C$ from captured thermal images $I_1, I_2, \ldots I_n$. First, images $I_1, I_2, \ldots I_n$ are captured by LWIR camera 20. (Step 51). Each image $I_1, I_2, \ldots I_n$ is comprised of a plurality of pixels (j,k), with each image having the same number of pixels. Image processor calculates average intensity and variation over all images $I_1, I_2, \ldots I_n$ for each pixel. (Step S2). Average pixel intensity for pixel (j,k) is $P_{Avg} = [I(j,k)_1 + I(j,k)_2 + \ldots + I(j,k)_n]/n$ where $I(j,k)_i$ is the intensity of pixel (j,k) of image $I_i$. Average pixel variation, similarly, can be either standard deviation or variance (i.e. maximum $I(j,k)_f$—minimum $I(j,k)_m$) across all images of pixel (j,k).

Processor 22 next calculates average area intensities and area variation across all images $I_1, I_2, \ldots I_n$ with respect to a selected pixel S. (Step S3) In some embodiments, pixel S can corresponding in at least image to a location of a feature sub-image $f_1, f_2, \ldots f_n$. Average area intensity and area variation are calculated by averaging across a set of pixels determined by a length scale L.

Figure 4:
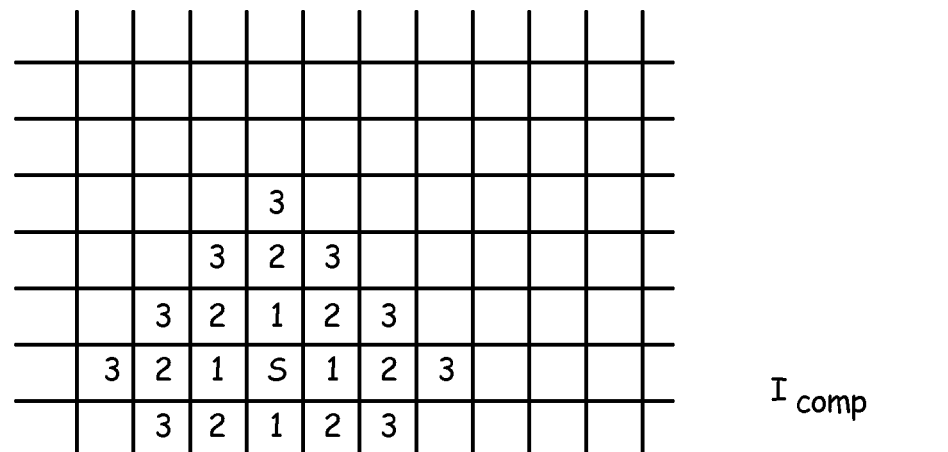
FIG. 4 is a pixel map illustrating areas of various length scales, centered about a selected pixel.

FIG. 4 is a pixel map illustrating one possible areas of pixel coverage with length scales L=0, 1, 2, and 3. FIG. 4 depicts an area A defined by a distance from selected pixel S in taxicab geometry. Pixel S alone populates the set of pixels defining area $A_0$ at length scale L=0. Pixel S and all pixels labeled 1 populate the set of pixels defining area $A_1$ at length scale L=1. Pixel S and all pixels labeled 1 or 2 populate the set of pixels defining area $A_2$ at length scale L=2. Pixel S and all pixels labeled 1, 2, or 3 populate the set of pixels defining area $A_3$ at length scale L=3. Areas are similarly defined for larger length scales, although area A that abut a boundary of images $I_1, I_2, \ldots I_n$ can contain fewer pixels. In some embodiments of the present invention, Cartesian (rather than taxicab) geometry can be used to define areas A, e.g. by including all pixels that overlap or fall within a circle of radius L of selected pixel S.

Figure 5:
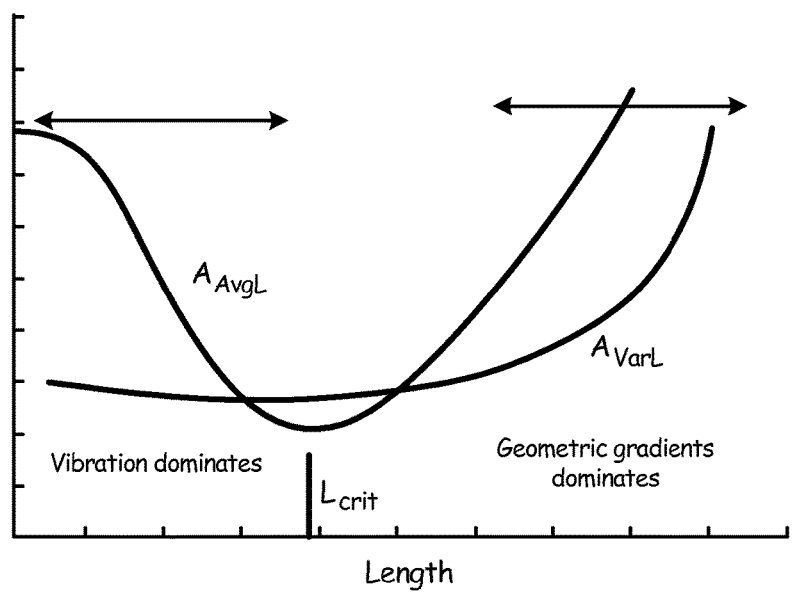
FIG. 5 is a simplified graph of area intensity variation as a function of length scale.

Processor 22 calculates average area intensity $A_{AvgL}$ and variation $A_{varL}$ using average pixel intensities $A_{Avg}$ (produced in step S2), for a range of length scales L=1, 2, … i. (Step S3). Each average area intensity $A_{AvgL}$ and variation $A_{VarL}$ corresponds to thermal intensity in LWIR (and variation in that intensity) in a corresponding area $A_L$. Processor 22 then identifies a critical length scale $L_{crit}$. (Step S4). FIG. 5 is a simplified graph of average area intensity $A_{AvgL}$ and variation $A_{VarL}$ as a function of length. FIG. 5 illustrates how variation $A_{VarL}$ across area $A_L$ decreases as length scale L increases, until $L_{crit}$ (a geometric length scale) is reached. As L increases past $L_{crit}$, variation $A_{VarL}$ tends to increase as length scale L starts to be comparable to the variation that exists within the part. FIG. 5 further illustrates how average area intensity $A_{AvgL}$ changes with length scale L. Average area intensity $A_{AvgL}$ remains substantially constant until temperature gradients that exist in workpiece 12 come to dominate over the variation due to vibration, causing area intensity $A_{AvgL}$ to dramatically increase for large length scales L.

Figure 6:
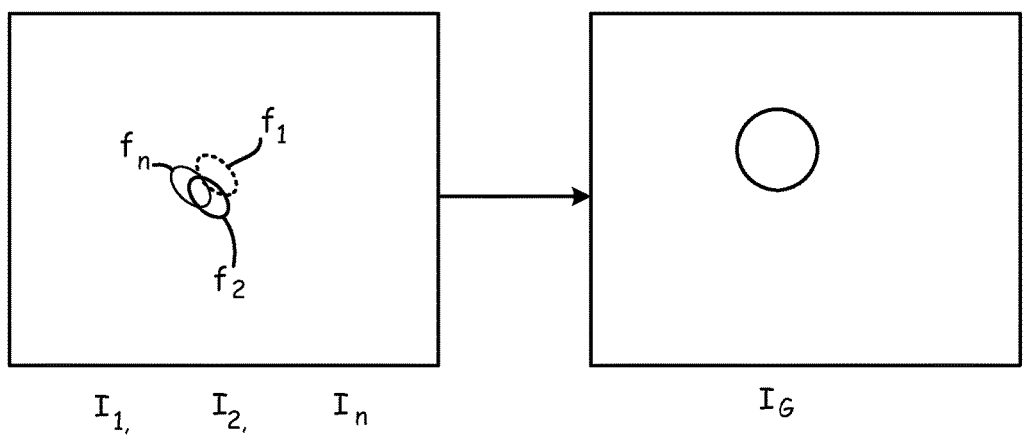
FIG. 6 is a schematic view of combination of the images of FIG. 2 into a composite image.

FIG. 6 is a schematic view illustrating the combination of the images $I_1, I_2, \ldots I_n$ into composite thermal image $I_C$. Image processor 22 builds composite thermal image $I_C$ of workpiece 12 using critical length scale $L_{crit}$. (Step S5). Each pixel (j,k) of composite thermal image $I_C$ can be assigned an intensity equal to the average area intensity $A_{AvgLcrit}$ of an area $A_{Lcrit}$ with critical length scale $L_{crit}$ centered on that pixel location (j,k). Critical length scale $L_{crit}$ corresponds to a natural resolution of thermal imaging system 10 due to vibration and rotational movement of workpiece 12. Increasing shutter speed of LWIR camera 20 will tend to reduce critical length scale $L_{Crit}$, allowing more precise localization of features sub-images $f_1, f_2, \ldots, f_n$ at the cost of less image exposure for that component of the variation which is due to pixel blur due to rotational effects. Similarly, critical length scale $L_{crit}$ increases as vibration amplitude of workpiece 12 relative to LWIR camera 20 increases, due to increased image shift between sequential images $I_i, I_{i+1}$. By using critical length scale $L_{crit}$, thermal imaging system 10 increases imaging accuracy by reducing inaccuracy due to hyperprecision. In some embodiments, image processor 22 can further map isothermal lines using composite thermal image $I_C$.

Discussion of Possible Embodiments

The following are non-exclusive descriptions of possible embodiments of the present invention.

A method for thermally imaging a moving workpiece of a gas turbine engine, the method comprising: capturing a plurality of thermal images of the workpiece, during operation of the gas turbine engine; determining average pixel intensity and pixel variation in intensity for each pixel across the plurality of LWIR images; determining average area intensity and area variation in intensity across a range of areas defined by increasing length scales about a selected pixel; identifying as a critical length scale a length scale at which area variation in intensity is minimized as a function of length scale; and building a composite image wherein each pixel of the composite image has intensity equal to an average area intensity centered on that pixel, over the critical length scale.

The method of the preceding paragraph can optionally include, additionally and/or alternatively, any one or more of the following features, configurations and/or additional components:

A further embodiment of the foregoing method, wherein capturing the plurality of thermal images comprises sequentially capturing a series of images with a single LWIR camera.

A further embodiment of the foregoing method, wherein capturing the plurality of thermal images comprises capturing at least a first image with a first LWIR camera, and at least a second image with a second LWIR camera.

A further embodiment of the foregoing method, further comprising mapping isothermal lines of the composite image, at a natural resolution equal to the critical length scale.

A further embodiment of the foregoing method, wherein identifying the areas defined by increasing length scales about the selected pixel are defined by taxicab geometric distance from the selected pixel equal to the increasing length scale.

A further embodiment of the foregoing method, wherein identifying the areas defined by increasing length scales about the selected pixel are defined by Cartesian distance from the selected pixel equal to the increasing length scale.

A method for processing a plurality of long wavelength infrared (LWIR) images using at least one processor, the method comprising: determining average pixel intensity and pixel variation in intensity for each pixel across the plurality of LWIR images; determining average area intensity and area variation in intensity across a range of areas defined by increasing length scales about a selected pixel; identifying as a critical length scale a length scale at which area variation in intensity is minimized as a function of length scale; and building a composite image wherein each pixel of the composite image has intensity equal to an average area intensity centered on that pixel, over a the critical length scale.

The method of the preceding paragraph can optionally include, additionally and/or alternatively, any one or more of the following features, configurations and/or additional components:

A further embodiment of the foregoing method, wherein capturing the plurality of LWIR images comprises sequentially capturing a series of images with a single LWIR camera.

A further embodiment of the foregoing method, wherein capturing the plurality of LWIR images comprises capturing at least a first image with a first LWIR camera, and at least a second image with a second LWIR camera.

A further embodiment of the foregoing method, further comprising mapping isothermal lines of the composite image, at a natural resolution equal to the critical length scale.

A further embodiment of the foregoing method, wherein identifying the areas defined by increasing length scales about the selected pixel are defined by taxicab geometric distance from the selected pixel equal to the increasing length scale.

A further embodiment of the foregoing method, wherein identifying the areas defined by increasing length scales about the selected pixel are defined by Cartesian distance from the selected pixel equal to the increasing length scale.

A gas turbine engine thermal imaging system comprising: a camera disposed to capture a plurality of thermal images of a moving workpiece of the gas turbine engine; and a processor configured to produce a composite thermal image of the moving workpiece by: determining average pixel intensity and pixel variation in intensity for each pixel across the plurality of thermal images captured by the camera; determining average area intensity and area variation in intensity across a range of areas defined by increasing length scales about a selected pixel; identifying as a critical length scale a length scale at which area variation in intensity is minimized as a function of length scale; and building the composite image such that each pixel of the composite image has intensity equal to an average area intensity centered on that pixel, over a the critical length scale.

The gas turbine engine thermal imaging system of the preceding paragraph can optionally include, additionally and/or alternatively, any one or more of the following features, configurations and/or additional components:

A further embodiment of the foregoing gas turbine engine thermal imaging system, wherein the camera is a long wavelength infrared (LWIR) camera.

A further embodiment of the foregoing gas turbine engine thermal imaging system, wherein the camera is disposed to capture a plurality of thermal images of a rotating airfoil.

A further embodiment of the foregoing gas turbine engine thermal imaging system, wherein the camera is disposed to capture the plurality of thermal images while the gas turbine engine is in operation.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for thermally imaging a moving workpiece of a gas turbine engine, the method comprising:
   capturing a plurality of thermal images of the workpiece, during operation of the gas turbine engine;
   determining average pixel intensity and pixel variation in intensity for each pixel across the plurality of long wavelength infrared (LWIR) images;
   determining average area intensity and area variation in intensity across a range of areas defined by increasing length scales about a selected pixel;
   identifying as a critical length scale a length scale at which area variation in intensity is minimized as a function of length scale;
   building a composite image wherein each pixel of the composite image has intensity equal to an average area intensity centered on that pixel, over the critical length scale; and
   mapping isothermal lines of the composite image, at a natural resolution equal to the critical length scale.

2. The method of claim 1, wherein capturing the plurality of thermal images comprises sequentially capturing a series of images with a single LWIR camera.

3. The method of claim 1, wherein capturing the plurality of thermal images comprises capturing at least a first image with a first LWIR camera, and at least a second image with a second LWIR camera.

4. The method of claim 1, wherein identifying the areas defined by increasing length scales about the selected pixel are defined by taxicab geometric distance from the selected pixel equal to the increasing length scale.

5. The method of claim 1, wherein identifying the areas defined by increasing length scales about the selected pixel are defined by Cartesian distance from the selected pixel equal to the increasing length scale.

6. A method for processing a plurality of long wavelength infrared (LWIR) images using at least one processor, the method comprising:
   determining average pixel intensity and pixel variation in intensity for each pixel across the plurality of LWIR images;
   determining average area intensity and area variation in intensity across a range of areas defined by increasing length scales about a selected pixel;
   identifying as a critical length scale a length scale at which area variation in intensity is minimized as a function of length scale;
   building a composite image wherein each pixel of the composite image has intensity equal to an average area intensity centered on that pixel, over the critical length scale; and
   mapping isothermal lines of the composite image, at a natural resolution equal to the critical length scale.

7. The method of claim 6, wherein capturing the plurality of LWIR images comprises sequentially capturing a series of images with a single LWIR camera.

8. The method of claim 6, wherein capturing the plurality of LWIR images comprises capturing at least a first image with a first LWIR camera, and at least a second image with a second LWIR camera.

9. The method of claim 6, wherein identifying the areas defined by increasing length scales about the selected pixel are defined by taxicab geometric distance from the selected pixel equal to the increasing length scale.

10. The method of claim 6, wherein identifying the areas defined by increasing length scales about the selected pixel are defined by Cartesian distance from the selected pixel equal to the increasing length scale.

11. A gas turbine engine thermal imaging system comprising:
   a camera disposed to capture a plurality of thermal images of a moving workpiece of the gas turbine engine; and
   a processor configured to produce a composite thermal image of the moving workpiece by:

determining average pixel intensity and pixel variation in intensity for each pixel across the plurality of thermal images captured by the camera;

determining average area intensity and area variation in intensity across a range of areas defined by increasing length scales about a selected pixel;

identifying as a critical length scale a length scale at which area variation in intensity is minimized as a function of length scale;

building the composite image such that each pixel of the composite image has intensity equal to an average area intensity centered on that pixel, over a the critical length scale; and mapping isothermal lines of the composite image, at a natural resolution equal to the critical length scale.

12. The gas turbine engine thermal imaging system of claim 11, wherein the camera is a long wavelength infrared (LWIR) camera.

13. The gas turbine engine thermal imaging system of claim 11, wherein the camera is disposed to capture a plurality of thermal images of a rotating airfoil.

14. The gas turbine engine thermal imaging system of claim 11, wherein the camera is disposed to capture the plurality of thermal images while the gas turbine engine is in operation.

* * * * *